3,429,801
TWO-STAGE HYDROREFINING OF ASPHALTENE-CONTAINING OILS
William K. T. Gleim, Island Lake, and Mark J. O'Hara, Mount Prospect, Ill., assignors to Universal Oil Products Company, Des Plaines, Ill., a corporation of Delaware
Filed Dec. 6, 1965, Ser. No. 511,749
U.S. Cl. 208—58                4 Claims
Int. Cl. C10g 37/00

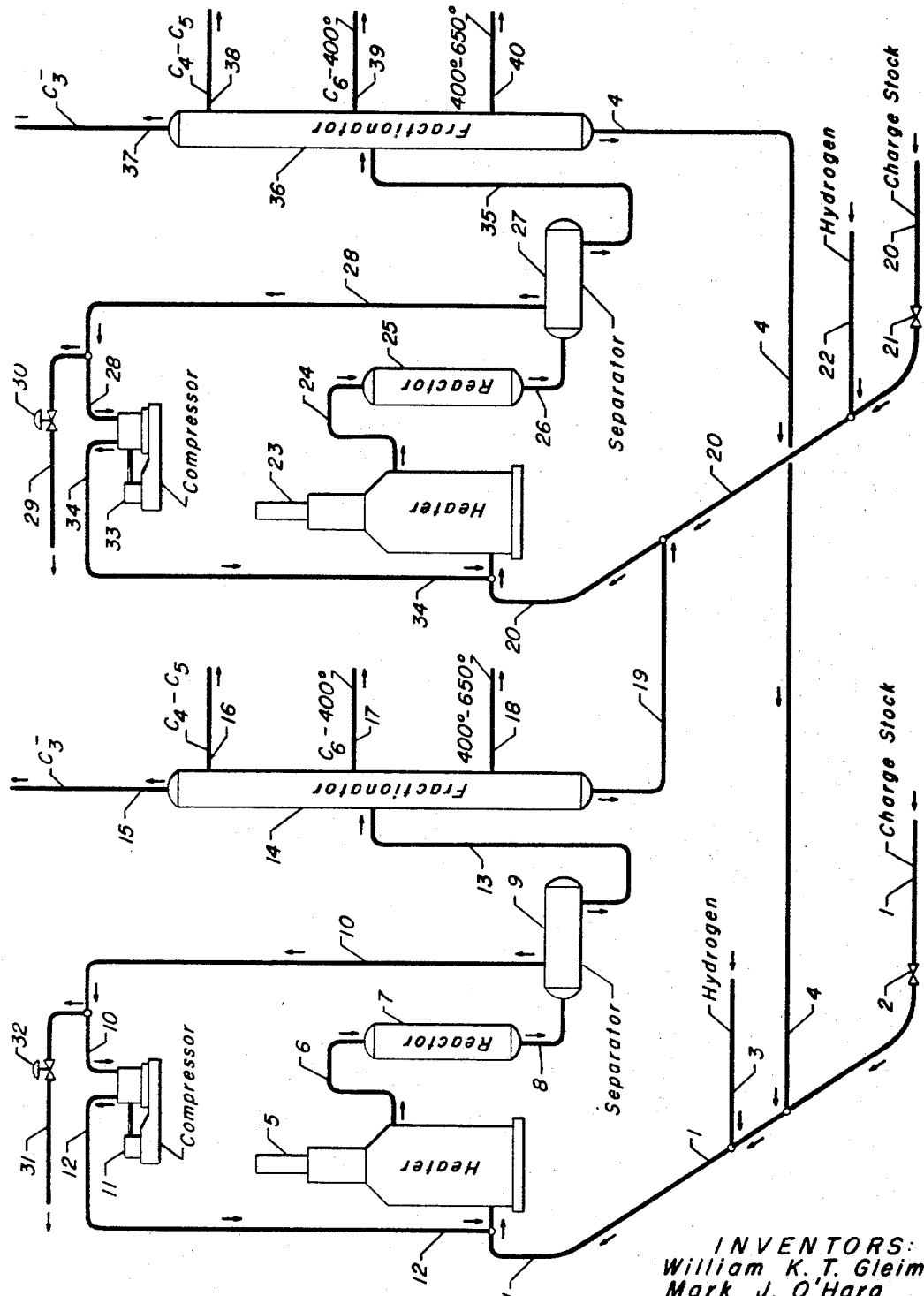

ABSTRACT OF THE DISCLOSURE

Two stage continuous-cyclic catalytic hydrorefining of asphaltene-containing heavy oil wherein the first stage reactor effluent is separated to provide a first fraction having a 650° F.+IBP which is passed to the second stage reactor. The second stage reactor effluent is separated to provide a second fraction having a 650° F.+IBP which is recycled to the first stage reactor. The point of introducing the charge stock is periodically alternated between the first and second stage reactors, as required according to the extent of catalyst deactivation therein, while the flow of the first and second fractions is continuously maintained.

---

The invention described herein relates to the hydrorefining of petroleum crude oils, and other heavy hydrocarbon fractions and/or distillates, for the primary purpose of reducing significantly the concentration of contaminating influences contained therein. More particularly, the present invention is directed toward a cyclic, continuous process for hydrorefining an asphaltene-containing hydrocarbon charge stock, which process involves catalyst reactivation through the cyclic utilization of a heavy cycle oil obtained from the hydrorefined charge stock.

Petroleum crude oils, topped or reduced crude oils, and other heavy hydrocarbon fractions and/or distillates, including black oils, visbreaker effluent, tar sand oils, etc., contain various non-metallic and metallic impurities which detrimentally affect various processes to which such heavy hydrocarbon fractions may be subjected. Generally included among the non-metallic impurities are large quantities of nitrogen, sulfur and oxygen, usually found to exist in heteroatomic compounds. Nitrogen is undesirable because it effectively poisons various catalytic composites which may be employed in the conversion of these petroleum fractions. Nitrogenous and sulfurous compounds are further objectionable, since the combustion of various fuels containing these impurities effects the release of nitrogen oxides and sulfurous oxides which are noxious, corrosive, and present, therefore, a serious problem with respect to atmospheric pollution.

In addition to the foregoing described contaminating influences, petroleum crude oils and other heavy carbonaceous material contain high molecular weight asphaltenic compounds. These are non-distillable, oil insoluble coke precursors which contain sulfur, nitrogen, oxygen and a variety of metals. They are generally colloidally dispersed within the crude oil, vacuum or tower bottoms product, and, when subjected to various reactions at elevated temperature have the tendency to polymerize, thereby making conversion to the more valuable distillable hydrocarbons extremely difficult. Thus, in the heavy bottoms product from a reduced crude vacuum distillation column, the polymerized asphaltenes exist as solid material even at ambient temperature; this type of product is probably useful only as road asphalt or as a low-grade fuel when cut back or diluted with middle-distillate hydrocarbons such as kerosene, light gas oil, etc.

Of the metallic contaminants, those containing nickel and vanadium are found to be most common and generally occur in the form of thermally stable organo-metallic complexes, such as metallic porphyrins and various derivatives thereof. A considerable quantity of the organo-metallic complexes are associated with asphaltenes and become concentrated in a residual fraction; some of the organo-metallic complexes are volatile, oil-soluble and are, therefore, carried over into lighter distillate fractions. A reduction in the concentration of the organo-metallic complexes is not easily achieved, and to the extent that the crude oil, or other heavy hydrocarbon charge stock, becomes suitable for further processing. With respect to the hydrogenation, hydrorefining and/or hydrocracking of topped or reduced crude oils, atmospheric tower bottoms product and/or vacuum tower bottoms product containing excessive quantities of asphaltenic compounds, some of which may be linked with the organo-metallic complexes, the primary difficulty resides in carbon formation due to the asphaltenic compounds, such carbon formation being favored as a result of the insolubility of these asphaltenic compounds. This gummy carbonaceous deposit causes the catalyst particles to become bound together, thereby restricting the flow of reactants through the catalyst bed.

The desirability of removing the foregoing described contaminating influences is well-known within the art of petroleum refining, and, heretofore, two principal approaches have been advanced: liquid phase hydrogenation and vapor phase hydrocracking. In the former type of process, the oil is passed upwardly in liquid phase and in admixture with hydrogen through a fixed bed, or slurry of sub-divided catalyst. Although perhaps effective in removing oil-soluble organo-metallic complexes, such a process is relatively ineffective with respect to the oil-insoluble asphaltenes which are colloidally dispersed within the charge stock. Since the hydrogenation zone is at an elevated temperature, the retention of these unconverted asphaltenes, suspended in a free liquid-phase oil for an extended period of time, results in polymerization, causing conversion thereof to become substantially more difficult. On the other hand, vapor phase hydrocracking is carried out either with a fixed bed, or an expanded bed system at temperatures substantially above about 950° F. While this technique obviates to some extent the drawbacks of liquid phase hydrogenation, it is not suited to treating heavy hydrocarbon fractions due to their non-volatility which causes coke formation, with the result that the catalystic composite succumbs to rapid deactivation; this requires a large capacity catalyst regeneration system in order to implement the process on a continuous basis. Since the rate of diffusion of the oil-insoluble asphaltenes is significantly lower than that of dissolved molecules of approximately the same molecular size, a fixed bed process in which the charge stock and hydrogen are passed in a downwardly direction has been thought to be highly impractical. Selective hydrorefining and/or hydrocracking of a wide boiling range charge stock is not easily obtained and excessive amounts of light gases are produced at the expense of more valuable normally liquid hydrocarbons. The deposition of excessive quantities of gummy carbonaceous material results in plugging of fixed catalyst beds, as well as restriction of the recirculation in fluidized catalyst systems.

The object of the present invention is to provide a continuous process for hydrorefining an asphaltene-containing charge stock, such as a petroleum crude oil, atmospheric tower bottoms product or vacuum tower bottoms, which process may be conducted continuously without incurring the detrimental effects otherwise experienced. As hereinafter indicated, this object is accomplished through the cyclic feeding of a selective solvent to effect the dissolution of the asphaltenic material which has resulted in gummy carbonaceous deposits to form upon the catalyst disposed within the reaction zone. This selective solvent is a hydrocarbon fraction separated from the liquid product resulting from the initial processing of the charge stock; such a hydrocarbon fraction is capable of transferring hydrogen from itself to the asphaltenes, thereby converting the same to pentane-soluble hydrocarbon products, and furthermore is stable to thermal cracking at elevated temperatures up to about 425° C. The utilization of such a solvent permits the subsequent hydrorefining reactions to be effected at high severity conditions of operation, thereby effecting a significant degree of hydrocracking to increase the yield of lower-boiling hydrocarbon products, various selective fractions of which have significantly decreased nitrogen and sulfur concentrations.

Therefore, in a broad embodiment, the present invention relates to a process for hydrorefining an asphaltenic charge stock, which process comprises the steps of: (a) reacting said charge stock and hydrogen in a first reaction zone containing a hydrorefining catalyst; (b) separating the resulting first zone product effluent to provide a first hydrocarbon fraction having an initial boiling point of at least about 650° F.; (c) commingling said first fraction with hydrogen and reacting the resulting mixture in a second reaction zone containing a hydrorefining catalyst; (d) separating the resulting second zone product effluent to provide a second hydrocarbon fraction having an initial boiling point of at least about 650° F.; (e) recycling said second fraction to said first reaction zone; (f) discontinuing the flow of charge stock to said first reaction zone, when the catalyst disposed therein becomes deactivated as a result of the asphaltenes in said charge stock, and introducing said charge stock to said second reaction zone; and (g) discontinuing the flow of charge stock to said second reaction zone, when the catalyst disposed therein becomes deactivated as a result of the asphaltenes in said charge stock, and reintroducing said charge stock to said first reaction zone.

The process described in the foregoing embodiment is further characterized in that the first and second reaction zones are maintained at a temperature within the range of about 300° C. to about 525° C., preferably with an upper limit of about 500° C. During that period of operation when the asphaltene-containing charge stock is being processed, the hydrorefining reaction zone temperature is generally within the range of about 425° C. to about 500° C. The first hydrocarbon fraction and hydrogen are reacted in the second hydrorefining reaction zone at a lower temperature, from about 300° C. to about 425° C. Both reaction zones are maintained under an imposed hydrogen pressure within the range of from about 1000 to about 5000 pounds per square inch, and the rate of the charge stock to the reaction zone is generally greater than a weight hourly space velocity of 1.5. In the present specification and the appended claims, the term "weight hourly space velocity" is defined as the weight of hydrocarbon charge per hour per weight of catalyst disposed within the reaction zone. The quantity of the second cycle oil fraction being recycled to combine with the charge stock and hydrogen, is such that the volumetric ratio of said second oil fraction to said charge stock is from about 1:4 to about 2:1.

From the foregoing embodiment, and the characterizations thereof, it will be noted that the hydrorefining process of the present invention involves the cyclic feeding of a previous hydrogenated cycle oil and added hydrogen at such time as the catalytic composite accumulates gummy carbonaceous deposits to the extent that the catalyst is no longer capable of functioning in the desired and necessary manner. An essential feature of the present invention resides in the character of the recycled hydrocarbon solvent, it being a hydrocarbon fraction having an initial boiling point of at least about 650° F., and having been derived from the previously hydrogenated charge stock. This oil solvent, herein referred to as the first hydrocarbon fraction, is passed through a second reaction zone, the catalyst in which has indicated that it has lost its propensity for effecting the removal of various contaminating influences from the charge stock. The flow of hydrogen, being admixed with both the charge stock and this first fraction, is in an amount of from about 5,000 to about 50,000 standard cubic feet per barrel, supplemental hydrogen being added from a suitable external source to compensate for that which is consumed in the reaction zones. The first hydrocarbon fraction is utilized to remove the gummy carbonaceous material from the catalyst, previously employed in processing the charge stock, at a temperature within the range of from about 300° C. to about 425° C., in order that the first hydrocarbon fraction will not be subjected to thermal cracking, but at least a portion thereof will undergo catalytic hydrocracking. Under these conditions of operation, the hydrogenated first fraction is capable of transferring hydrogen from itself to the asphaltenes, thereby converting the same into pentane-soluble hydrocarbons, which in turn are subjected to catalytic hydrocracking to produce additional lower-boiling hydrocarbon products. The reaction zone product effluent, resulting from the processing of this first hydrocarbon fraction, is separated to provide a second hydrocarbon fraction having an initial boiling point of at least about 650° F. This second fraction is then recycled to combine with the hydrocarbon charge stock being processed in the first reaction zone at a temperature of from about 425° C. to about 500° C., and in an amount to result in a volumetric ratio, of said second fraction to said charge stock, within the range of about 1:4 to about 2:1.

The process of the present invention may be understood more clearly upon reference to the accompanying drawing which illustrates an embodiment thereof. It is understood, however, that it is not intended to limit the present invention to the embodiment so illustrated. In the drawing, various valves, controls, heat-exchangers, condensers, knock-out pots, and other miscellaneous appurtenances have been reduced in number or entirely eliminated. These are not considered to be essential for a clear understanding of the present invention, and the use thereof will be readily apparent to those possessing skill within the art of petroleum processing.

With reference now to the drawing, the charge stock, for example a Wyoming sour crude oil having a gravity of about 23.2° API at 60° F., enters the process through line 1 containing valve 2. The charge stock is admixed with hydrogen from an external source in line 3 and a hydrocarbon fraction having an initial boiling point of at least about 650° F. in line 4. The source of this hydrocarbon fraction is hereinafter described in greater detail. The resulting mixture continues through line 1, being further admixed with recycle hydrogen from line 12, and enters heater 5 wherein the temperature is increased to a level of 450° C. The mixture, containing hydrogen in an amount within the range of from about 5,000 to about 50,000 standard cubic feet per barrel, continues through line 6 into reactor 7. Reactor 7 contains a fixed bed of a suitable hydrorefining catalyst, the preferred composition and character of which is hereinafter described. The product effluent is withdrawn from reactor 7 via line 8, and is passed into high-pressure separator 9, from which a gaseous phase is withdrawn via line 10 by compressor 11, being recycled through line 12 to combine with the mixture of charge stock and the hydrocarbon fraction in line 1, prior to increasing the temperature in heater 5. In order to maintain pressure control on reactor 7, at least a portion of the gaseous phase in line 10 is withdrawn via line 31 containing control valve 32.

The normally liquid hydrocarbon portion of the product effluent is withdrawn from separator 9 via line 13, and is introduced into fractionator 14. The principal function of fractionator 14 is to separate the product effluent to provide a first hydrocarbon fraction having an initial boiling point of at least about 650° F., being withdrawn from the fractionator through line 19. That portion of the product effluent which boils below a temperature of about 650° F. may be separated into a wide variety of any desired fractions. As illustrated, the product effluent in line 13 may be separated to provide a fraction containing light paraffinic hydrocarbons, methane, ethane, and propane, which result in part from the hydrocracking reactions effected in reactor 7; these are indicated as leaving fractionator 14 via line 15. A second light fraction, consisting primarily of hydrocarbons containing 4 and 5 carbon atoms is removed via line 16, and forms an excellent charge stock for an isomerization process, or may be utilized as gasoline blending stock. Gasoline boiling range hydrocarbons, those boiling up to a temperature of about 400° F., are withdrawn via line 17, and middle-distillate hydrocarbons boiling between about 400° F. and about 650° F. are withdrawn via line 18. These latter two fractions have been substantially reduced in sulfur and nitrogen concentrations, and may be subjected to processes such as hydrocracking, catalytic reforming, etc. The first hydrocarbon fraction, withdrawn through line 19, is admixed with added external hydrogen entering the process via lines 22, and recycle hydrogen entering via line 34, the mixture passing through line 20 into heater 23, wherein the temperature thereof is increased to a level of about 325° C. The heated mixture, containing from about 5,000 to about 50,000 standard cubic feet of hydrogen per barrel of liquid hydrocarbons, passes through line 24 into reactor 25. As hereinafter set forth, reactor 25 may contain a hydrorefining catalytic composite of the same composition and character of that disposed in reactor 7, or the catalyst may be of a different composition dependent to a great extent on the precise character of the original hydrocarbon charge stock. The product effluent from reactor 25 passes through line 26 into a high-pressure separator 27, a gaseous phase from which is removed via line 28 and compressor 33, to be recycled through line 34 into line 20. Pressure control is maintained on reactor 25 by withdrawing a portion of the gaseous phase through line 29 containing control valve 30. The normally liquid product effluent is removed from separator 27 through line 35, and is introduced into fractionator 36. Fractionator 36 serves to function similar to that of fractionator 14. Thus, light paraffinic hydrocarbons are withdrawn via line 37, butanes and pentanes via line 38, gasoline boiling range hydrocarbons via line 39, middle-distillate hydrocarbons via line 40 and a second hydrocarbon fraction, having an initial boiling point of at least about 650° F., is withdrawn via line 4. The second fraction continues through line 4, being admixed with the original hydrocarbon charge stock and hydrogen in line 1. The amount of the second hydrocarbon fraction is such that the volumetric ratio thereof to said charge stock is within the range of from about 1:4 to about 2:1.

At such time as analyses on the various fractions of the product effluent from reactor 7 indicate that the catalyst therein is losing its capability to remove contaminating influences, and further that little or no hydrocracking reactions are being effected, the flow of charge stock through line 1 is discontinued by closing valve 2, and the charge stock introduced into the process via line 20 by opening valve 21. In this manner, the hydrocarbon fraction in line 4 ultimately becomes the first fraction resulting from the hydrorefined charge stock now being removed from reactor 25 via line 26. Similarly, the hydrocarbon fraction in line 19, resulting from the product effluent from reactor 7, becomes the second fraction being admixed with the charge stock and hydrogen in line 20. As the flow of charge stock is switched from line 1 to line 20, the duty on heater 23 is increased since the charge stock is processed at a temperature of about 450° C. By the same token, the duty on heater 5 is decreased since it is preferred to process the first hydrocarbon fraction at a lower temperature of about 325° C.

The hydrocarbon fraction in line 4 is then utilized to reactivate the hydrorefining catalyst in reactor 7 by effecting the removal and conversion of the asphaltenic compounds which have caused gummy carbonaceous material to become deposited thereon. At such time as the catalytic composite disposed in reactor 25 becomes deactivated as the result of the polymerization of asphaltenes, the point of introduction of the charge stock is again switched by opening valve 2 and closing valve 21.

From the foregoing description of the drawing, and upon reference thereto, it will be noted that the hydrocarbon fraction from the product effluent of reactor 7, having an initial boiling point of at least 650° F., always passes into reactor 25, whether reactor 25 is, with respect to the charge stock, the first or second reaction zone. Similarly, the hydrocarbon fraction from the product effluent of reactor 25 is always passed into reactor 7, whether this reactor is the first or the second reaction zone with respect to the charge stock.

From the foregoing description of the embodiment illustrated in the accompanying drawing, it will be noted that the present process permits the continuous hydrorefining of petroleum crude oils, and other asphaltene-containing hydrocarbon mixtures, utilizing a catalytic composite which is continuously maintained at a high level of activity. Although this continuous process is cyclic in nature, there exists no complete interruption of the flow of liquid hydrocarbons into and through the reaction zones. For example, considering only reactor 7, the liquid flow will consist either of a mixture of the charge stock and hydrocarbon fraction from fractionator 36, or only the hydrocarbon fraction from fractionator 36. In the first instance, the hydrocarbon fraction from fractionator 36 will have been processed through both reactors 7 and 25, whereas in the second instance, it will have been processed only in reactor 25, and will constitute what has been referred to herein as a first hydrocarbon fraction derived from the hydrorefined product effluent of the charge stock.

In addition to effecting substantial reactivation of the catalytic composite, and to the degree that the effective catalyst life is extended considerably, another advantage resides in the fact that those hydrocarbons boiling above a temperature of about 650° F., whether originally present in the charge stock or appearing in the product effluent therefrom, are processed within the multiple reaction zones in such a manner that a considerable portion thereof is effectively recycled to extinction. The remaining portion of the product hydrocarbons boiling above a temperature of about 650° F. may be withdrawn from the process as a product stream, and constitutes an exceptionally suitable heavy oil charge stock for processing in a catalytic hydrocracking unit particularly designed to maximize the production of gasoline boiling range hydrocarbons.

Although a wide variety of hydrorefining catalysts may be utilized in effecting the process of the present invention, a particularly preferred composite is a 4-component catalyst comprising alumina, silica, molybdenum, and at least one metallic component from the iron-group of the Periodic Table. This catalytic composite may be specifically tailored to effect hydrorefining reactions while simultaneously being relatively immune to the deactivating influence of sulfurous compounds and especially insensitive to nitrogenous compounds; also, while functioning at the relatively severe operating conditions hereinbefore set forth, the catalyst is further capable of effecting a substantial degree of hydrocracking, notwithstanding the presence of nitrogenous compounds. With respect to the composite of alumina and silica, the alumina is present in an amount of from about 50.0% to about 80.0%, and at least as great as silica which is present in an amount of from about 20.0% to about 50.0%. The molybdenum component will be present in an amount of from about 13.0% to about 20.0%, calculated as the element, and not as if existing in some combined form, based upon the weight of the alumina-silica composite. The Iron-group components, iron, cobalt, and particularly nickel, are present in an amount less than the molybdenum, and within the range of from about 1.0% to about 6.0% by weight of the alumina-silica composite, also being calculated as if existing as the element. This 4-component catalyst may be manufactured by any suitable means, and a particularly convenient method utilizes impregnating techniques. The impregnating method of preparation involves initially forming an aqueous solution of water-soluble compounds of nickel and molybdenum, such as nickel nitrate, nickel chloride, ammonium molybdate, molybdic acid, etc. The alumina-silica carrier material particles are commingled with the aforementioned aqueous solution and subsequently dried at a temperature of about 250° F. The dry composite is thereafter subjected to a high temperature calcination technique in an atmosphere of air at a temperature within the range of about 600° F. to about 1700° F. The carrier material may be impregnated first with the molybdenum-containing solution, subsequently dried and calcined, and thereafter impregnated with the nickel-containing solution. On the other hand, the two solutions may be first commingled with each other, and the carrier material impregnated in a single step. The particular means which are utilized for the preparation of the catalytic composite is not considered to be a limitation upon the process of the present invention. Likewise, the molybdenum and nickel, after being composited with the alumina-silica carrier material, may be caused to exist therein in any desired form, and either as the element or as some compound thereof. Thus, the calcined composite may be further treated for the purpose of providing a catalyst in which the molybdenum and nickel exist as sulfides, oxides, sulfates, or in their most reduced state.

When the charge stock constitutes a crude tower bottoms product or vacuum tower bottoms product, as distinguished from the full boiling range crude oil, a particularly satisfactory catalyst comprises nickel and molybdenum composited with a carrier material consisting of 68.0% by weight of alumina, 10.0% by weight of silica, and 22.0% by weight of boron phosphate. Through the use of this carrier material, it is possible to lower the minimum molybdenum concentration to about 6.0%. That is, a satisfactory hydrorefining catalyst comprises about 1.0% by weight of nickel and about 8.0% by weight of molybdenum on the carrier material of alumina, silica and boron phosphate.

The following examples are given for the purpose of illustrating the means by which the process encompassed by the present invention is effected. The charge stock, temperatures, pressures, catalysts, rates, etc., are herein presented as being exemplary only, and are not intended to limit the invention to an extent greater than that defined by the scope and spirit of the appended claims. The charge stock utilized to illustrate the process of the present invention is a "topped" Wyoming sour crude oil. The full boiling range crude oil, having a gravity of about 23.2° API at 60° F., is contaminated by the presence of about 2.8% by weight of sulfur, 2700 p.p.m. of total nitrogen and about 100 p.p.m. of combined nickel and vanadium (computed as elemental nickel and vanadium), and contains a high-boiling pentane-insoluble asphaltenic fraction in an amount of about 8.39% by weight. This full boiling range crude oil was "topped," having about 5.0% by volume of light-ends removal, and indicated a gravity °API at 60° F., of 19.5, a concentration of about 3.0% by weight of sulfur, 2900 p.p.m. of total nitrogen, 105 p.p.m. of nickel and vanadium, the pentane-insoluble asphaltenic fraction being about 8.8% by weight. The catalyst utilized was a composite of 2.0% by weight of nickel and 16.0% by weight of molybdenum combined with 68.0% by weight of alumina, 10.0% by weight of silica and 22.0% by weight of boron phosphate.

EXAMPLE I

This example is presented to illustrate the effective reactivation of the catalytic composite through the use of a heavy hydrocarbon fraction obtained from the original charge stock. The topped Wyoming sour crude oil was passed into a reaction zone containing 100 grams of the above-described catalyst, in the form of spheres of 20 to 150 micron diameter, at a rate of 200 grams per hour (a weight hourly space velocity of 2.0). The inlet temperature to the catalyst bed was maintained at 790° F., the crude oil, in admixture with hydrogen in an amount of 50,000 standard cubic feet per barrel, being initially heated to that temperature. The temperature in the reaction zone was maintained at 3,000 p.s.i.g.

These conditions were maintained for a test period of 36-hour duration, during which time the total quantity of crude oil processed amounted to 7,200 grams. At the end of this period, and after the reactor had been cooled and depressured, an analysis of the catalyst indicated that 1.03% by weight of the crude oil charge had been deposited on the catalyst as carbon. Furthermore, the catalyst was virtually bonded together in a solid mass, no portion of which could be screened through 60-mesh. The liquid product from this 36-hour period indicated that a substantial conversion of the charge stock to lower-boiling hydrocarbon products had been effected, in that the gravity °API at 60° F., had been increased to about 33.1.

For the second portion of the test period, without effecting a change in operating conditions, the crude oil was processed for 18 hours to yield a total liquid product having a gravity, °API at 60° F., of about 32.9, the heavy hydrocarbon fraction of which (boiling above 650° F.) indicated a gravity of 21.7° API at 60° F. The flow of crude oil through the reaction zone was discontinued after 18 hours, and this heavy hydrocarbon fraction charged to the reaction zone for a period of nine hours, after which the crude oil was reintroduced for another 18-hour period. This in turn was followed by a second 9-hour period in which only the heavy fraction was processed. During the entire 54-hour period, 7,200 grams of crude oil was processed during 36 hours, and 3,600 grams of heavy fraction were processed during 18 hours, for a total liquid charge to the reaction zone of 10,800 grams. The test for free-flowing catalyst indicated that more than 91.0% passed 60-mesh; furthermore, the catalyst analysis indicated 0.55% carbon on the catalyst, based upon the total liquid being processed.

In addition, the total liquid product, resulting from the crude oil, indicated a gravity of about 32.9° API at 60° F. for the 36 hours, while the total liquid product from the heavy fraction, stated above as having a gravity of about 21.7°, averaged about 27.5° API for the 18 hours. Thus, not only did the intermittent feeding of the heavy fraction effect a substantial degree of catalyst reactivation, by causing the dissolution of the absorbed asphaltenes thereon, but the heavy fraction further reacted to product additional lower-boiling (less than 650° F.) hydrocarbons.

EXAMPLE II

This example is presented for the purpose of illustrating the cyclic continuousness of the present process when hydrorefining the contaminated topped crude oil previously described. Both reaction zones have disposed therein 100 grams of the same catalyst, an alumina-silica composite containing 1.8% nickel and 16.0% molybdenum, calculated as the elements thereof. Both zones are maintained under an imposed hydrogen pressure of 3,000 p.s.i.g., and the hydrogen concentration in each zone is maintained at 50,000 s.c.f./b.b.l. of liquid hydrocarbons by compensation from an external source (cylinder hydrogen) for that consumed in each reaction zone. The first reaction zone is maintained at an inlet catalyst temperature of 425° C., and the second reaction zone at an inlet temperature of about 325° C. The topped sour crude is charged to the first zone at a rate of 200 grams per hour, after being admixed with hydrogen and heated to the operating temperature.

The total product effluent passes into a high-pressure separator, maintained at about room temperature, from which a hydrogen-rich gaseous phase, containing ammonia, hydrogen sulfide and some light paraffinic hydrocarbons, is removed via a compressor. Following the treatment of this gaseous phase, to increase the concentration of hydrogen, by removing primarily ammonia and hydrogen sulfide, the same is recycled to combine with the crude oil charge stock. The normally liquid hydrocarbons are stripped of the remaining light paraffins, and fractionated into a butane-pentane fraction, a gasoline boiling range fraction ($C_6$–400° F.), a middle-distillate fraction (400° F.–650° F.) and a heavy hydrocarbon fraction containing those hydrocarbons boiling above 650° F., the latter having a gravity, °API at 60° F., of about 20.5. The total liquid product effluent, prior to separation into the foregoing described fractions, has a gravity of 35.2° API.

The heavy fraction is admixed with hydrogen in an amount of 50,000 s.c.f./b.b.l., and the mixture raised to a temperature of 325° C., prior to being introduced to the second reaction zone. The liquid product effluent from this second zone, following removal of hydrogen-rich gaseous phase which is recycled by compressive means to combine with the hydrocarbon fraction being charged to this zone, indicates a gravity of about 27.0° API. This liquid effluent is separated into the previously described select fractions, to provide a second heavy hydrocarbon fraction comprising those remaining hydrocarbons having boiling points above about 650° F. The second fraction, having a gravity of about 20.0° API, is combined with the charge stock and hydrogen prior to reacting the same in the first reaction zone.

After a period of operation of more than 36 hours, analyses indicate that the gravity of the total liquid effluent from the first reaction zone is gradually falling off from the original level of 35.2° API. When these analyses show a gravity of about 30.0° to about 31.0°, the charge stock is cut out of the first reaction zone and is introduced into the second reaction zone. Insofar as the flow of reactants and/or process streams is concerned, this is the sole change made. However, two significant changes are made involving the operating conditions: (1) the temperature of the inlet to the catalyst in the second zone is raised from a level of 325° C. to 425° C. (2) the temperature in the first zone is lowered from 425° C. to 325° C. Thus, the two reaction zones have, in effect, merely reversed their positions with respect to the charge stock stream.

The heavy hydrocarbon fraction now being reacted with hydrogen in the first reaction zone at 325° C., effectively transfers hydrogen to the asphaltenes which are being removed from the catalyst, and converted into pentane-soluble hydrocarbons. As these asphaltenes are removed from the catalyst, more active surfaces and centers thereof become available for contact with the heavy hydrocarbon fraction and the absorbed, soluble asphaltenes, such that a significant quantity is subjected to additional catalytic hydrocracking. This becomes evident since the gravity of the reaction zone liquid effluent begins to increase from about 20.0° API to a value of about 27.5° API. When, during the next cycle, the charge stock is reintroduced into this zone, the liquid product effluent indicates increased reactions by a gravity of about 35.4° API compared to 30.5° API when the catalyst was considered deactivated.

The foregoing examples and specifications clearly show the method employed to conduct the progress of the present invention, and indicate the benefits to be afforded through utilization thereof.

We claim as our invention:

1. A process for hydrorefining an asphaltene-containing hydrocarbon charge stock which comprises:
    (a) reacting said charge stock and hydrogen in a first reaction zone containing a hydrorefining catalyst at a first temperature level of from about 797° F. to about 932° F. whereby at least a portion of said charge stock undergoes catalytic hydrocracking;
    (b) separating the resulting first zone product effluent to provide a first hydrocarbon oil having an initial boiling point of at least about 650° F.;
    (c) commingling said first oil with hydrogen and reacting the resulting mixture in a second reaction zone containing a hydrorefining catalyst at a second temperature level lower than said first temperature level and within the range of from about 572° F. to about 797° F.;
    (d) separating the resulting second zone product effluent to provide a second hydrocarbon oil having an initial boiling point of at least about 650° F.;
    (e) continuously recycling said second oil to said first reaction zone;
    (f) discontinuing the flow of charge stock to said first reaction zone when the catalyst disposed therein becomes deactivated as a result of the asphaltenes in said charge stock, and introducing said charge stock to said second reaction zone and increasing the temperature of said second reaction zone to said first temperature level and decreasing the temperature of said first reaction zone to said second temperature level while continuously passing said first oil to said second reaction zone;
    (g) discontinuing the flow of charge stock to said second reaction zone when the catalyst disposed therein becomes deactivated as a result of the asphaltenes in said charge stock, and reintroducing said charge stock to said first reaction zone and increasing the temperature of said first reaction zone to said first temperature level and decreasing the temperature of said second reaction zone to said second temperature level while maintaining the continuous flow of said first oil and the continuous recycle of said second oil as aforesaid; and
    (h) recovering a hydrorefined hydrocarbon product from at least one of said product effluents.

2. The process of claim 1 further characterized in that the weight hourly space velocity of said charge stock is at least about 1.5.

3. The process of claim 1 further characterized in that said hydrorefining catalysts comprise metallic components selected from the metals of Groups VI–B and VIII of the Periodic Table, and compounds thereof, combined with a carrier material containing alumina and silica.

4. The process of claim 1 further characterized in that said hydrorefining catalysts comprise metallic components selected from the metals of Groups VI–B and VIII of the Periodic Table, and compounds thereof, combined with a carrier material containing alumina, silica and boron phosphate.

References Cited

UNITED STATES PATENTS

| | | | |
|---|---|---|---|
| 2,608,521 | 8/1952 | Hoog | 208—254 |
| 2,697,683 | 12/1954 | Engel et al. | 208—216 |
| 2,723,946 | 11/1955 | Donaldson | 208—79 |
| 2,838,446 | 6/1958 | Donaldson | 252—411 |
| 2,944,098 | 7/1960 | Fogle et al. | 252—411 |
| 3,215,618 | 11/1965 | Watkins | 208—254 |

DELBERT E. GANTZ, *Primary Examiner.*

G. J. CRASANAKIS, *Assistant Examiner.*

U.S. Cl. X.R.

208—210, 264, 216, 97; 252—412